United States Patent

Kikuchi et al.

[15] 3,689,630
[45] Sept. 5, 1972

[54] BARIUM SULFATE CONTRAST MEDIA

[72] Inventors: Katsumi Kikuchi; Koji Daigo, both of Sakai-shi, Japan

[73] Assignee: Sakai Chemical Industry Company Limited, Osaka-fu, Japan

[22] Filed: Sept. 9, 1968

[21] Appl. No.: 758,597

[52] U.S. Cl. ............................................. 424/4
[51] Int. Cl. ....................................... A61k 27/08
[58] Field of Search ................................ 424/4, 5

[56] References Cited

UNITED STATES PATENTS

| | | |
|---|---|---|
| 2,659,690 | 11/1953 | Slaybaugh ............... 424/4 |
| 2,996,433 | 8/1961 | Hoppe et al. ............ 424/5 |
| 3,218,349 | 11/1965 | Chapman et al. ........ 424/5 |
| 3,235,462 | 2/1966 | Wolfson .................. 424/4 |
| 3,236,735 | 2/1966 | Brown ..................... 424/4 |

*Primary Examiner*—Albert T. Meyers
*Assistant Examiner*—Frederick E. Waddell
*Attorney*—Larson, Taylor & Hinds

[57] ABSTRACT

A barium sulfate contrast medium which comprises a barium sulfate aqueous suspension having a barium sulfate concentration of 750 to 1,200 grams per liter of the suspension and containing carbon dioxide in combination with a suspending agent, said carbon dioxide being contained in the range of 0.2 to 4 gas volume.

9 Claims, No Drawings

BARIUM SULFATE CONTRAST MEDIA

This invention relates to barium sulfate contrast media, particularly to aqueous suspension of barium sulfate used in X-ray photography or fluoroscopy of digestive system.

Barium sulfate has been used for years as a contrast medium in the form of an aqueous suspension in examination of digestive system. The barium sulfate contrast medium is required to have:

1. High suspension stability to permit trouble-free storage and transportation,
2. Higher concentration of barium sulfate to enhance contrast effect,
3. Low liquid viscosity to facilitate oral administration, and
4. Forming a smooth, continuous and uniform coating on the surface of the digestive canal to be examined.

The conventional barium sulfate contrast media, however, with such useful properties as above mentioned have not so far been provided. For example, barium sulfate merely suspended in water is extremely unstable, and barium sulfate settles in quite a short time. To improve the stability of the suspension, suspending agents such as sodium carboxymethyl cellulose, sodium alginate, gelatin, tragacanth, etc. are used. Such agents improve the stability of the suspension and lower the viscosity of the suspension. Thus, the addition of said agents improves the stability of the suspension but to an insufficient extent. The increase of the agents used increases the stability but at the same time increases the liquid viscosity to make the oral administration difficult. The trend is prominent with higher concentration of barium sulfate. In fact when the suspension contains barium sulfate in an amount of more than 750 grams per liter of the suspension and a suspending agent in such an amount as to secure sufficient stability, the viscosity thereof is elevated to make the administration difficult. That is, in the conventional art there has been proposed no contrast media of high concentration with excellent stability and low viscosity.

The conventional fluoroscopy of digestive system was effected by filling the digestive canal with barium sulfate to which X-rays were irradiated, but in this method, when affected part is located near the edge of the image, it can be well detected but if at the center of the image it is apt to be overlooked. To improve such drawback double contrast method has been proposed, in which after administrating barium sulfate suspension, gas such as air is introduced so as to form double images of positive contrast medium of barium sulfate and negative medium of gas. In the above method, however, it is practically very difficult to effectively introduce gas such as air into digestive canal after the administration of barium sulfate. Thus, barium sulfate suspension suitable for double contrast photography is strongly expected to be developed.

Accordingly, an object of the invention is to provide a barium sulfate contrast medium which is stable at a concentration of as high as more than 750 grams per liter of the suspension and has low viscosity.

Another object of the invention is to provide a barium sulfate contrast medium which permits double contrast photography merely by administration without subsequent introduction of gas such as air into digestive canal.

Still another object of the invention is to provide a barium sulfate contrast medium which can give a smooth, continuous, and uniform coating on the inner walls of digestive canal without forming objectionable lumps.

A further object of the invention is to provide a barium sulfate contrast medium which is made palatable by suppressing disagreeable taste.

The above and other objects of the invention will be apparent from the following description.

The contrast medium of the invention comprises a barium sulfate aqueous suspension having a barium sulfate concentration of 750 to 1,200 grams per liter of the suspension and containing carbon dioxide in combination with a suspending agent, said carbon dioxide being contained in the range of 0.2 to 4 gas volume. The term "gas volume" means the volumes of the gas reduced to 0°C. and 760 mm dissolved by one volume of the suspension.

According to the invention the barium sulfate aqueous suspension should necessarily contain carbon dioxide and a suspending agent, for which a barium sulfate suspension having high concentration but being low in viscosity, stable and suitable for administration can be obtained. With the suspension having such high concentration of barium sulfate and containing only carbon dioxide but no suspending agent, the liquid viscosity of the suspension will rise too high for oral administration against the object of the invention.

The suspension of the invention is thus stable at high concentration and low in viscosity, and further, when administered, carbon dioxide contained in the suspension will so expand within digestive canal that barium sulfate is pressed against the inner walls of the canal, thus forming a smooth, continuous and uniform coating on the surface of the canal without allowing formation of lumps. And because of the presence of carbon dioxide, double contrast photography of digestive system becomes possible without introduction of the gas after administration of the contrast medium and gives palatable and refreshing taste in administration just like drinking aerated water.

In the invention barium sulfate of finer grain is preferred, and generally barium sulfate of an average particle size of 0.02 to 2 $\mu$ may be used, most desirable being those having an average particle size of smaller than 1 $\mu$. The barium sulfate is contained in the present suspension in such a high concentration as 750 to 1,200 grams, preferably 800 to 1,100 grams, per liter of the suspension.

The suspension of the invention should contain carbon dioxide, in the range of 0.2 to 4 gas volume. If the carbon dioxide is used in excess of the above amount a special pressure vessel will become necessary and when opened for administration, the suspension will blow out, and if less amount of the gas is used, the stability of the suspension can not be improved sufficiently. Desirable amount of carbon dioxide is 0.4 – 1.2 gas volume.

The conventional suspending agents, such as sodium carboxymethyl cellulose, sodium alginate, gelatin, tragacanth, acacia, etc. can be used for the purpose. The amount of the suspending agent used can be suitably selected according to the kinds of the agent used, barium sulfate concentration of the suspension, etc. but generally it may be used in the range 0.2 – 10 by weight percent. Preferable amount of sodium carboxymethyl cellulose and sodium alginate is 0.4 to 1.1 weight percent and that of gelatin, tragacant and acacia is 1 to 5 weight percent, based on the weight of the barium sulfate.

Through the researches of the inventors it was found that by adding to the contrast medium of the invention water-soluble salts of citric acid, polyphosphoric acid and ethylenediaminetetraacetic acid, the liquid viscosity is considerably reduced without affecting the stability of the contrast medium. There are available various water-soluble salts of said acids, desirable being alkali metal salts such as sodium, potassium, etc.; alkali earth metal salts such as magnesium, etc.; and ammonium salts, etc. These salts may be either normal salts or hydrogen salts, but normal salts are preferable. Concretely, these are sodium citrate, potassium citrate, magnesium citrate, ammonium citrate, sodium pyrophosphate, potassium pyrophosphate, sodium metaphosphate, potassium metaphosphate, sodium ethylenediaminetetraacetate, potassium ethylenediaminetetraacetate, etc. The most desirable of these salts are water-soluble salts of polyphosphoric acids, which not only reduce the viscosity of the suspension but also completely eliminate flocculation or coagulation occurring when barium sulfate comes in contact with gastric juice, said flocculation often leading to erroneous diagnosis. These water-soluble salts can be singly or in mixture in a range of 0.01 to 2 weight percent, preferably 0.1 and 0.6 weight percent, based on the weight of the barium sulfate.

The contrast medium of the invention can be prepared, for example, by first dissolving in water a suspending agent, then suspending barium sulfate in the resultant aqueous solution with stirring, placing thus homogenized mixture in a container, dissolving carbon dioxide in the mixture and finally sealing the container. Carbon dioxide in an amount of only 0.2 – 4 gas volume will exhibit sufficient effects, so that no particular pressure vessel is needed. Carbon dioxide can be introduced in the form of carbonated water or Dry Ice. When carbonated water is used, the homogenized mixture is placed in a container and cooled to about 0 to 10°C to which carbonated water cooled at the same temperature is added and the container is sealed, and in the case of the latter, Dry Ice pellets can be placed in the container holding the mixture, and sealed immediately. When a water soluble salt of citric acid, polyphosphoric acid and ethylenediaminetetraacetic acid is used, it may be first dissolved in water with a suspending agent, or may be dissolved in water singly and after suspending barium sulfate in the solution a suspending agent is added to the homogenized mixture.

To the contrast medium of the invention can be added as desired sweetening material, spices, antiseptic, etc. according to the conventional method.

For better understanding of the invention examples are given below.

EXAMPLE 1

In excess amount of water the predetermined amount of sodium carboxymethyl cellulose was dissolved, and to the solution 75 kilograms of barium sulfate was added with stirring in amount necessary for producing final suspension of barium sulfate concentration of 750 grams per liter of the suspension. 50 milliliters of the resultant homogenized mixture was placed in each tin-plated can, to which the predetermined amount of Dry Ice was added and the can was immediately sealed.

For comparison suspensions were prepared in the similar manner as above, in which sodium carboxymethyl cellulose or carbon dioxide was not used.

For measuring the viscosity of each suspension, the respective can were cooled to 5°C and the suspensions were taken out therefrom. The viscosity of the suspensions was measured by using Brookfield viscometer at 30 rpm at 5°C, with the results shown in Table 1 below.

TABLE 1

| No. | CMC-Na (wt%) | $CO_2$ Content (Gas Vol.) | Viscosity (cps) |
|---|---|---|---|
| 1 – a | 0 | 0 | 3,500 |
| 1 – b | 0 | 0.2 | >4,000 |
| 1 – c | 0 | 1.0 | >4,000 |
| 2 – a | 0.2 | 0 | 38 |
| 2 – b | 0.2 | 1.0 | 35 |
| 2 – c | 0.2 | 1.0 | 36 |
| 3 – a | 0.6 | 0 | 76 |
| 3 – b | 0.6 | 0.2 | 65 |
| 3 – c | 0.6 | 1.0 | 61 |
| 4 – a | 1.0 | 0 | 130 |
| 4 – b | 1.0 | 0.2 | 125 |
| 4 – c | 1.0 | 1.0 | 122 |

From the Table 1 above the effects of suspending agents and carbon dioxide on the viscosity of the suspension will be apparent. The addition of about 0.2 weight percent suspending agent to the suspension reduces the viscosity but with the addition of a larger amount of the suspending agent it gradually increases the viscosity. The suspension containing carbon dioxide but no suspending agent has markedly higher viscosity than that containing no carbon dioxide and suspending agent, and is unfit for oral administration. However, in the case of the suspension containing both suspending agent and carbon dioxide the effect of carbon dioxide on the viscosity of the suspension is unnoticeable and it shows almost no rise of viscosity as compared with that containing no carbon dioxide.

EXAMPLE 2

In excess amount of water the predetermined amount of sodium carboxymethyl cellulose was dissolved and to the solution barium sulfate was added with stirring in amount necessary for producing final suspension of barium sulfate concentration of 1,000 grams per liter of the suspension. 50 milliliters of the homogenized mixture thus obtained was placed in each 50-milliliter graduated glass cylinder, to which the predetermined amount of Dry Ice was added and the cylinder was immediately plugged airtight.

For comparison suspensions were prepared in the similar manner as above, in which sodium carboxymethyl cellulose was not used.

The results of measurement of the viscosity and stability of the suspensions prepared as above are given in the Table 2 below. The viscosity was measured in the same manner as in Example 1, and suspension stability was measured by leaving each cylinder to stand at 5°C for 5 days, and then measuring the volume of the portion turning transparent, using the following criteria:

++ More than 2.0 cc was transparent
+ 1.5 – 2.0 cc was transparent
− No transparent portion or less than 1.5 cc

TABLE 2

| No. | CMC-Na (wt%) | $CO_2$ content (gas vol) | viscosity (cps) | Stability |
|---|---|---|---|---|
| 5 – a | 0.4 | 0 | 158 | ++ |
| 5 – b | 0.4 | 0.2 | 147 | − |
| 5 – c | 0.4 | 0.5 | 140 | − |
| 5 – d | 0.4 | 1.0 | 136 | − |
| 6 – a | 0.6 | 0 | 335 | + |
| 6 – b | 0.6 | 0.2 | 330 | − |
| 6 – c | 0.6 | 0.5 | 318 | − |
| 6 – d | 0.6 | 1.0 | 315 | − |
| 7 – a | 0.8 | 0 | 580 | + |
| 7 –0 b | 0.8 | 0.2 | 560 | − |
| 7 – c | 0.8 | 0.5 | 540 | − |
| 7 – d | 0.8 | 1.0 | 541 | − |
| 8 – a | 1.0 | 0 | 790 | + |
| 8 – b | 1.0 | 0.2 | 787 | − |
| 8 – c | 1.0 | 0.5 | 802 | − |
| 8 – d | 1.0 | 1.0 | 815 | − |
| 9 – a | 1.1 | 0 | 1512 | + |
| 9 – b | 1.1 | 0.2 | 1530 | − |
| 9 – c | 1.1 | 0.5 | 1518 | − |
| 9 – c | 1.1 | 1.0 | 1509 | − |

From the above results it has been found the contrast media of the invention containing carbon dioxide as well as the suspending agent can be improved of its stability without the increase of viscosity.

EXAMPLE 3

In excess amount of water the predetermined amount of sodium hexametaphosphate was dissolved and to the solution barium sulfate was added with stirring in amount necessary for producing final suspension of barium sulfate concentration of 1,000 grams per liter of the suspension. To the homogenized mixture thus obtained was added with stirring the predetermined amount of aqueous solution of sodium carboxymethyl cellulose, and after cooling to 5°C 100 milliliters of the mixture was placed in each tin-plated can, to which was added the predetermined amount of Dry Ice and the can was immediately sealed.

The viscosity of the respective suspensions prepared as above was measured in the same manner as in Example 1 and the flocculation stability of the suspensions on artificial gastric juice is shown in Table 3 below, in which the flocculation stability was measured by adding each suspension dropwise to 10 milliliters of the artificial gastric juice shown below and the results observed with the necked eye were determined according to the following criteria:

++ Distinct flocculation was observed
+ Slight flocculation was observed
± No flocculation but slight changes occurred
− No changes were observed Artificial gastric juice

| Sodium chloride | 2.0 grams |
| Pepsin | 3.2 grams |
| 10 weight percent hydrochloric acid | 24.0 milliliters |
| Distilled water | Amount necessary for making 1 liter solution |

TABLE 3

| No. | CMC —Na (wt%) | $CO_2$ Content | Sodium hexametaphosphate (wt%) | Viscosity (cps) | Flocculation stability on artificial gastric juice |
|---|---|---|---|---|---|
| 10 – a | 0.3 | 0 | 0 | 127 | + |
| 10 – b | 0.3 | 0.5 | 0 | 128 | ± |
| 10 – c | 0.3 | 1.0 | 0 | 130 | ± |
| 14 d | 0.3 | 0.5 | 0.3 | 69 | − |
| 10 – e | 0.3 | 1.0 | 0.3 | 87 | − |
| 11 – a | 0.6 | 0 | 0 | 335 | + |
| 11 – b | 0.6 | 0.5 | 0 | 318 | ± |
| 11 – c | 0.6 | 1.0 | 0 | 315 | ± |
| 11 – d | 0.6 | 0.5 | 0.3 | 194 | − |
| – e | 0.6 | 1.0 | 0.3 | 211 | − |
| 12 – a | 1.0 | 0 | 0 | 790 | ++ |
| 12 – b | 1.0 | 0.5 | 0 | 792 | + |
| 12 – c | 1.0 | 1.0 | 0 | 815 | + |
| 12 – d | 1.0 | 0.5 | 0.3 | 564 | ± |
| 12 – e | 1.0 | 1.0 | 0.3 | 561 | ± |

From the above test results, it was observed by the addition of sodium hexametaphosphate the viscosity of the suspension was considerably reduced to be easily administered. It was also seen the suspension containing the suspending agent only was unstable to gastric juice, showing flocculation, whereas with one containing carbon dioxide, the stability was improved and by further addition of sodium hexametaphosphate the stability on artificial gastric juice was further improved.

This trend was also same with the suspensions containing other water-soluble salts of polyphosphoric acids.

EXAMPLE 4

In 53.8 liters of water 0.6 kilograms of sodium citrate was dissolved, and to the solution 100 kilograms of barium sulfate was added with stirring. To the homogenized mixture was added with stirring aqueous solution of 1.2 kilograms of sodium carboxymethyl cellulose dissolved in 24 liters of water and after cooling to 5°C 100 milliliters of the mixture was placed in each tin-plated can, to which was added the predetermined amount of Dry Ice and the can was immediately sealed.

The viscosity of the suspension was measured in same manner as in Example 1, with the results, shown in Table 4 below.

TABLE 4

| No. | CMC-Na (wt%) | $CO_2$ Content | Sodium citrate (wt%) | Viscosity (cps) |
|---|---|---|---|---|
| 13 – a | 0.6 | 0 | 0 | 369 |
| 13 – b | 0.6 | 0.5 | 0 | 357 |
| 13 – c | 0.6 | 1.0 | 0 | 348 |
| 13 – d | 0.6 | 0.5 | 0.6 | 233 |
| 13 – e | 0.6 | 1.0 | 0.6 | 255 |

EXAMPLE 5

Barium sulfate suspension was prepared in the same manner as in Example 4 except that 0.5 kilogram of tetrasodium ethylenediaminetetraacetate was used in the place of sodium citrate, and 0.19 gram of Dry Ice was used.

The suspension thus obtained was stable and had a viscosity of 260 cps.

EXAMPLE 6

Barium sulfate suspension was prepared in the same manner as in Example 4 except that 0.6 kilograms of ammonium citrate was used in the place of sodium citrate, and 0.19 gram of Dry Ice was used.

The suspension thus obtained was stable and had a viscosity of 245 cps.

EXAMPLE 7

Barium sulfate suspension was prepared in the same manner as in Example 4 except that 0.6 kilogram of magnesium citrate was used in the place of sodium cirate, and 0.19 gram of Dry Ice was used.

The suspension thus obtained was stable and had a viscosity of 295 cps.

What we claim is:

1. A stable aqueous barium sulfate contrast medium suspension having a viscosity suitable for oral administration comprising barium sulfate, carbon dioxide and a suspending agent selected from the group consisting of sodium carboxymethyl cellulose, sodium alginate, gelatin, tragacanth and acacia, the barium sulfate concentration being from 750 to 1,200 grams per liter of medium and the carbon dioxide concentration being from 0.2 to 4 gas volumes the stability of said composition being indicated by less than 1.5 cc of said suspension turning transparent when 50 milliliters of said suspension is placed in an air-tight graduated glass cylinder at 5°C for 5 days.

2. The barium sulfate contrast medium according to claim 1, in which said barium sulfate is present in the range of 800 to 1,200 grams per liter of the suspension.

3. The barium sulfate contrast medium according to claim 1, in which said carbon dioxide is present in the range of 0.4 to 1.2 gas volume.

4. The barium sulfate contrast medium according to claim 1, in which said suspension further contains at least one water-soluble salt selected from the group consisting of alkali metal, alkaline earth metal and ammonium salts of an acid selected from the group consisting of polyphosphoric acid, citric acid and ethylenediaminetetraacetic acid in the range of 0.01 to 2 weight percent, based on the weight of the barium sulfate.

5. The barium sulfate contrast medium according to claim 4, in which said water-soluble salt is a water-soluble salt of polyphosphoric acid.

6. The barium sulfate contrast medium according to claim 5, in which said water-soluble salt of polyphosphoric acid is sodium hexametaphosphate.

7. The barium sulfate contrast medium according to claim 4, in which said water-soluble salt is a water-soluble salt of citric acid.

8. The barium sulfate contrast medium according to claim 4, in which said water-soluble salt is a water-soluble salt of ethylendiaminetetraacetic acid.

9. The barium sulfate contrast medium according to claim 4, in which said water-soluble salt is present in the range of 0.1 to 0.6 weight percent, based on the weight of the barium sulfate.

* * * * *